(12) United States Patent
Oda et al.

(10) Patent No.: US 7,566,504 B2
(45) Date of Patent: Jul. 28, 2009

(54) IRON SPECIES PREFORM

(75) Inventors: Teruyuki Oda, Tokyo (JP); Hiroshi Takiguchi, Tochigi (JP)

(73) Assignees: Fuji Jukogyo Kabushiki Kaisha (JP); Nippon Piston Ring, Co. Ltd (JP)

( * ) Notice: Subject to any disclaimer, the term of this patent is extended or adjusted under 35 U.S.C. 154(b) by 309 days.

(21) Appl. No.: 11/529,200

(22) Filed: Sep. 28, 2006

(65) Prior Publication Data
US 2007/0077447 A1    Apr. 5, 2007

(30) Foreign Application Priority Data
Sep. 30, 2005    (JP)    ............ P. 2005-287912

(51) Int. Cl.
   B32B 3/30     (2006.01)
   B32B 1/04     (2006.01)
   B32B 15/18    (2006.01)
   B32B 15/20    (2006.01)
   B22D 19/08    (2006.01)
   C23C 2/34     (2006.01)

(52) U.S. Cl. .............. 428/597; 428/577; 428/582; 428/601; 428/653; 428/681

(58) Field of Classification Search ............ None
See application file for complete search history.

(56) References Cited

U.S. PATENT DOCUMENTS

| | | | |
|---|---|---|---|
| 5,501,529 A * | 3/1996 | Cadle et al. ............ 384/432 |
| 6,422,755 B1 * | 7/2002 | Cadle et al. ............ 384/433 |
| 6,647,945 B2 * | 11/2003 | Harima ............ 123/195 R |
| 6,942,391 B2 * | 9/2005 | Nakamura ............ 384/432 |
| 7,014,677 B2 * | 3/2006 | Takiguchi et al. ............ 75/243 |
| 2002/0170161 A1 * | 11/2002 | Cadle et al. ............ 29/505 |
| 2003/0180172 A1 * | 9/2003 | Oda ............ 419/5 |
| 2004/0182200 A1 * | 9/2004 | Takiguchi et al. ............ 75/246 |
| 2006/0073065 A1 * | 4/2006 | Takiguchi et al. ............ 419/32 |

FOREIGN PATENT DOCUMENTS

JP    A-2004-204298    7/2004

* cited by examiner

*Primary Examiner*—Jennifer McNeil
*Assistant Examiner*—Jason L Savage
(74) *Attorney, Agent, or Firm*—Smith, Gambrell & Russell (57) ABSTRACT

An iron species preform for forming a metal matrix composite is inserted in an aluminum species alloy member to be cast-in. The aluminum species alloy member has bearing faces having a section in a semicircular arc shape. An inner peripheral face of the iron species preform is provided with a plurality of inner side grooves. The inner side groove includes flat portions and groove bottom portions continuous to two end edges continuous to the inner peripheral face and opposed to each other. In a cast-in step, shrinkage in a peripheral direction accompanied by solidifying a melted aluminum species alloy is uniformly received by the respective inner side grooves, movement in the peripheral direction is restrained, a clearance at an interface can be prevented from being brought about, so that a cast-in performance is excellent, and stable bonding strength and close contact of the interface can be ensured.

7 Claims, 10 Drawing Sheets

IRON SPECIES PREFORM

This application claims foreign priority from Japanese Patent Application No. 2005-287912, filed on Sep. 30, 2005, the entire contents of which are hereby incorporated by reference.

BACKGROUND OF THE INVENTION

1. Field of the Invention

The present invention relates to an iron species preform for forming a metal matrix composite suitable in cast-in performance by an aluminum species alloy used for forming a Metal Matrix Composite (MMC).

2. Related Art

In a background art, for example, in a vehicular engine, there is widely used a cylinder block constituted by casting an aluminum species alloy for achieving a reduction in weight. In such an engine, when a journal portion is formed in the cylinder block made of the aluminum species alloy (thermal expansion coefficient: about $21.0 \times 10^{-6}/°C.$) and a crankshaft made of an iron species material (thermal expansion coefficient: about $9 \times 10^{-6}$ through $12 \times 10^{-6}/°C.$) is axially supported by the journal portion by interposing a bearing metal, heat generated by combustion of a mixture gas at inside of a cylinder in operating the engine is transmitted to the journal portion. When a temperature of the journal portion rises, by a difference between the thermal expansion coefficients of the iron species material and a base metal comprising the aluminum species alloy, a clearance between a bearing face of the journal portion and the crankshaft interposing a bearing metal becomes excessively large to bring about vibration or noise in running a vehicle.

Hence, for example, in a journal portion for axially supporting a crankshaft of a horizontal opposed 4 cylinder engine, at the journal portion having a bearing face constituted by recessing respective center portions of left and right cylinder blocks comprising an aluminum species alloy in a shape of a semicircular arc, by constituting MMC by an iron species preform by inserting the iron species preform comprising an iron species powder sintered member during casting the cylinder block, a thermal expansion coefficient necessary for the journal portion is achieved without changing the aluminum species alloy of the cylinder block constituting the base material.

However, when a portion or a total of a cast product of an aluminum species alloy is constituted by MMC, it is extremely difficult to ensure a bonding strength of an interface by using generally a casting method, particularly, a High Pressure Die Casting (HPDC) and stably ensure adherence by easily melting the aluminum species alloy to invade a preform comprising an iron species powder sintered member. Further, it is known that when the preform comprising iron species powder sintered member is cast-in with an aluminum species alloy, a state of the melted aluminum species alloy invading the preform after a cast-in processing effects a significant influence on a mechanical property or a physical property, and a casting condition is frequently restricted in order to reduce such an influence.

Further, JP-A-2004-204298 discloses that wettability of the preform made of the iron species powder sintered member and the melted aluminum species alloy and the cast-in performance of the aluminum species alloy are improved, by constituting a structure of the preform made of an iron species powder sintered member to a structure in which a free Cu phase is dispersed in a matrix and by subjecting a shot blasting processing or a steaming processing to constitute a surface roughness of the preform by a specific roughness range, so that a bonding strength between the cylinder block main body made of the aluminum species alloy and the iron species preform is improved.

According to JP-A-2004-204298, the strength of the preform made of the iron species powder sintered member is increased by melting Cu to constitute a solid solution and the bonding strength of the interface is increased by reacting with the aluminum species alloy when the preform is cast-in with the aluminum species alloy by being precipitated into the matrix as the free Cu phase.

However, when the preform is cast-in with the aluminum species alloy, there is a concern that before the interface between the preform and the base material reaches a constant bonding strength when a stress generated in solidifying and shrinking the melted aluminum species alloy to which the preform is cast-in, due to a shape or a specification of the preform, the adherence of the interface becomes unstable and a clearance is generated at the interface to make the bonding strength unstable. Particularly, a space between the bearing face of the journal portion and the preform is extremely as thin as 2 through 3 mm, and there is a concern that in solidifying and shrinking the melted aluminum species alloy, a clearance is produced at the interface between the thin-walled portion and the preform by a stress generated at the thin-walled portion to make the bonding strength unstable. A phenomenon of instability of the bonding strength at the interface and production of the clearance or the like is significant when accompanied by rapid cooling and solidification as in HPDC.

When there is a clearance at the interface of the base material comprising the aluminum species alloy and the preform in the journal portion, a heat conduction efficiency between the base material and the preform is reduced at the portion to bring about a dispersion in the thermal conductivity in a peripheral direction of the journal portion. The thin-walled portion of the journal portion is not uniformly expanded by the dispersion, support of the bearing metal by the bearing face of the journal portion becomes unstable and a friction coefficient between the crankshaft and the bearing metal is increased. Owing to the increase in the friction coefficient, that is, an increase in a friction resistance, wear of the bearing metal is significantly increased to constitute a factor of deteriorating fuel cost, performance, durability or the like of the engine.

Further, when there is the clearance at the interface between the preform and the base material at the journal portion, in machining the bearing face of the journal portion, the portion formed by the thin wall is elastically deformed by a load in machining to deteriorate machining accuracy of the journal portion.

Further, when the clearance is present at the interface, stress concentration by high load is brought about by a residual stress or a difference of thermal expansion generated in solidifying and shrinking the melted aluminum species alloy into which the preform comprising the iron species powder sintered member is cast-in, and there is a case in which the aluminum species alloy portion, that is, the base material into which the preform is cast-in is destructed. Particularly, there is a concern that the portion is destructed by concentrating a stress to the thin-walled portion between the preform and the bearing face of the journal portion.

SUMMARY OF THE INVENTION

It is a first object of the invention to provide an iron species preform for forming a metal matrix composite suitable in a cast-in performance by an aluminum species alloy and capable of ensuring a stable interface bonding stress and adherence. Further, it is a second object of the invention to provide a structure of a journal portion having the iron species preform.

In accordance with one or more embodiments of the present invention, in a first aspect of the present invention, an iron species preform, for forming a metal matrix composite by casting-in the iron species preform with an aluminum species alloy base material, is provided with: an inner peripheral face having a section in a semicircular shape and continuously extending along a direction a center axis; and a plurality of inner side grooves formed on the inner peripheral face at spaces in a peripheral direction, each inner side groove continuously extending along the direction of the center axis and having a section of U-shape opened to the center axis. The inner side groove includes: two flat portions opposed to each other and having base ends respectively continuous to end edges continuous to the inner peripheral face; and a groove bottom portion continuously formed between depth ends of the two flat portions. When a length from the base end to the depth end of the flat portion is A, and a groove width of the inner side groove is B, 0.1 mm<A<1.0 mm, and 0.5 mm<B<10.0 mm.

Further, in accordance with one or more embodiments of the present invention, in a second aspect of the present invention, a radius of curvature (C) of a sectional shape of the groove bottom portion orthogonal to the center axis may be set in a range: 0.2B<C<B.

Further, in accordance with one or more embodiments of the present invention, in a third aspect of the present invention, a portion at which the two end edges continuous to the inner peripheral face and the flat portion are continuous may be a smoothly continuous curved face or a faced shape.

Further, in accordance with one or more embodiments of the present invention, in a fourth aspect of the present invention, an angle (E) of inclination of the flat portion relative to a reference line in a linear shape extended from the center axis to a center of the groove width may be set in a range: E<5°.

Further, in accordance with one or more embodiments of the present invention, in a fifth aspect of the present invention, a space (F) between the centers of the respective groove widths of the inner side grooves contiguous to each other may be set in a range: 1.5B<F<5B.

Further, in accordance with one or more embodiments of the present invention, in a sixth aspect of the present invention, the iron species preform may comprise an iron species powder sintered member.

In addition, in accordance with one or more embodiments of the present invention, in a seventh aspect of the present invention, a structure of a journal portion is constituted by an iron species preform according to any one of first to sixth aspects of the present invention is cast-in with an aluminum species alloy base material having a bearing face in a recess shape having a section in a semicircular arc shape along an inner peripheral face of the preform and continuously formed along a direction of a center axis line.

According to the first aspect of the present invention, by constituting the plurality of inner side grooves formed on the inner peripheral face of the iron species preform at spaces in the peripheral direction substantially in a U-shape by a section including the two flat portions respectively continuous to the two end edges continuous to the inner peripheral face and opposed to each other and the groove bottom portion continuously formed between the depth ends of the two flat portions and making the dimension from the base end to the depth end of the flat portion equal to or larger than 0.1 mm and equal to or smaller than 10.0 mm and making the groove width equal to or larger than 0.5 mm and equal to or smaller than 1.0 mm. Therefore, in an cast-in step, the melted aluminum species alloy injected to a thin-walled portion between the recess shape in a semicircular shape and the inner peripheral face of the preform invades insides of the number of respective inner side grooves formed in the peripheral direction, and when a shrinking stress is operated in the peripheral direction along the inner peripheral face of the iron species preform in solidifying and shrinking the melted aluminum species alloy injected to the thin-walled portion, shrinkage of the melted aluminum species in the peripheral direction in accordance with the solidification is uniformly received by the number of inner side grooves formed at the inner peripheral face of the iron species preform and movement of the melted aluminum species alloy in the peripheral direction is restrained. Thereby, the shrinking stress generated in solidifying and shrinking the melted aluminum species alloy is uniformly dispersed along the inner peripheral face of the iron species preform and by alleviating and making uniform a residual stress generated at the base material comprising the aluminum species alloy, the residual stress between the inner face and the inner peripheral face of the iron species preform is alleviated and the portion can be prevented from being cracked or the like.

Further, in accordance with restraining movement of the melted aluminums species alloy in solidifying and shrinking the melted aluminum species alloy, a clearance can be prevented from being brought about at an interface, a cast-in performance is excellent and stable bonding strength and adherence of the interface can be ensured.

According to the second aspect, by making the radius of curvature of the sectional shape of the groove bottom portion equal to or larger than 0.2 times as much as the groove width and equal to or smaller than the groove width, the clearance can be prevented from being brought about at the interface of the groove bottom portion and the bonding strength of the interface can be ensured.

According to the third aspect, by constituting the portion at which the two end edges continuous to the inner peripheral face and the flat portion are continuous by the smoothly continuous curved face or the faced shape, the interface strength and the adherence can be ensured, stress concentration in solidifying and shrinking of the melted aluminum species alloy is restrained and the base material is prevented from being broken or cracked.

According to the fourth aspect, by making the angle of inclination of the flat portion relative to the reference line in the linear shape extended from the center axis to the center of the groove width equal to or smaller than 5°, the interface strength and the adherence can be ensured, stress concentration in solidifying and shrinking the melted aluminum species alloy is retrained and the base material can be prevented from being broken or cracked.

According to the fifth aspect, by making the space between the centers of the respective groove widths of the inner side grooves contiguous to each other equal to or larger than 1.5 times as much as the groove width and equal to or smaller than 5 times as much as the groove width, the inner side groove is facilitated to be formed, the clearance can be prevented from being brought about at the interface and the bonding stress of the interface can be ensured.

According to the sixth aspect, since the iron species preform is structured by an iron species powder sintered member includes pores, by inserting the iron species powder sintered member into the melted aluminum species alloy so that the cast-in step is performed, the melted aluminum species alloy is melted to invade the iron species preform to be able to pertinently constitute MMC by the iron species preform.

According to the seventh aspect, in the journal portion formed by casting-in the iron species preform with the base material comprising the aluminum species alloy having the bearing face in the recess face shape continuously formed by the section in the semicircular arc shape along the inner peripheral face of the iron species preform, a difference between the thermal expansion coefficients of the journal portion and a shaft of an iron species material is reduced. So, even when a temperature of the journal portion rises, a clearance between the shaft and the bearing face can be confined to an allowable range and vibration or noise in rotating the shaft can be prevented from being brought about.

Further, a clearance of the interface at the inner peripheral face of the iron species preform is prevented from being brought about, a thermal conduction efficiency between the base material and the iron species preform is promoted and the thermal conductivity becomes uniform in the peripheral direction of the journal portion, the side of the bearing face of the journal portion is uniformly expanded and a circularity is ensured. Thereby, a friction coefficient between the shaft and the journal portion is restrained from being increased and in accordance with a reduction in a friction resistance, fuel cost, function, durability or the like of the engine can be ensured. Further, the clearance is eliminated at the interface between the thin-walled portion and the iron species preform in the journal portion, when the bearing face of the journal portion is machined, deformation by a load in machining is restrained and accuracy of machining the journal portion is promoted.

Other aspects and advantages of the invention will be apparent from the following description and the appended claims.

DETAILED DESCRIPTION OF THE EXEMPLARY EMBODIMENTS

An explanation will be given of exemplary embodiments of an iron species preform for forming a metal matrix composite and a structure of a journal portion having an iron species preform according to the invention, by taking examples of a journal portion of a crank shaft of a horizontal opposed 4 cylinder engine and an iron species prefrom arranged at the journal portion in reference to the drawings as follows.

First Exemplary Embodiment

Figure 1:
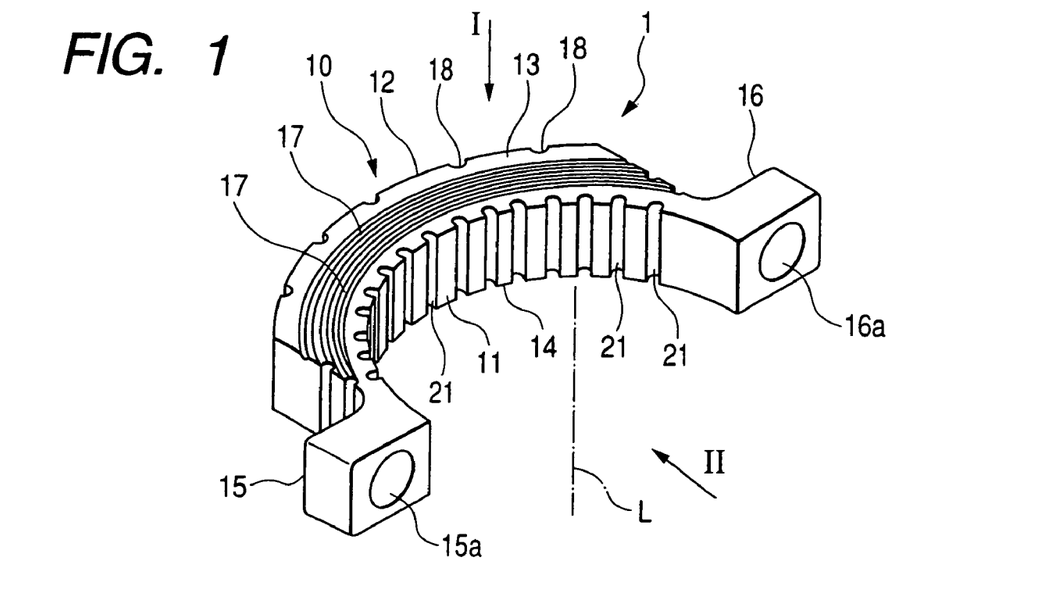
FIG. 1 is a perspective view showing an outline of an iron species preform according to a first exemplary embodiment.
Figure 2:
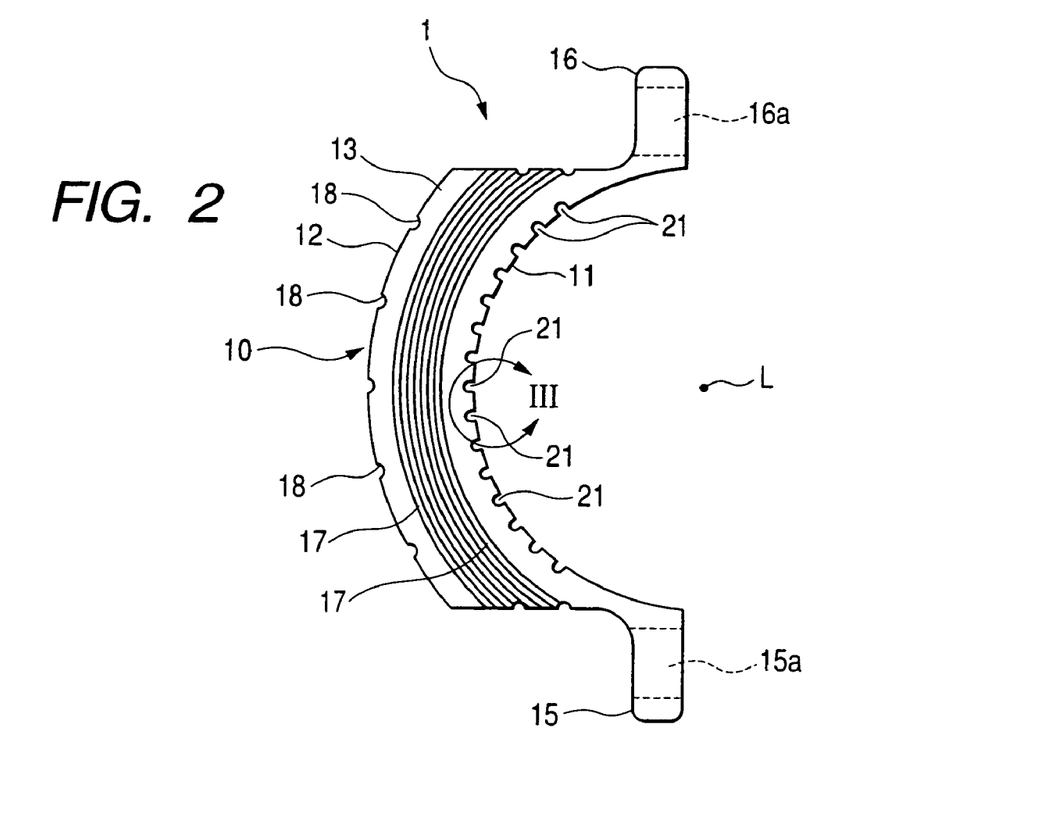
FIG. 2 is a view viewing FIG. 1 from I arrow mark direction.
Figure 3:
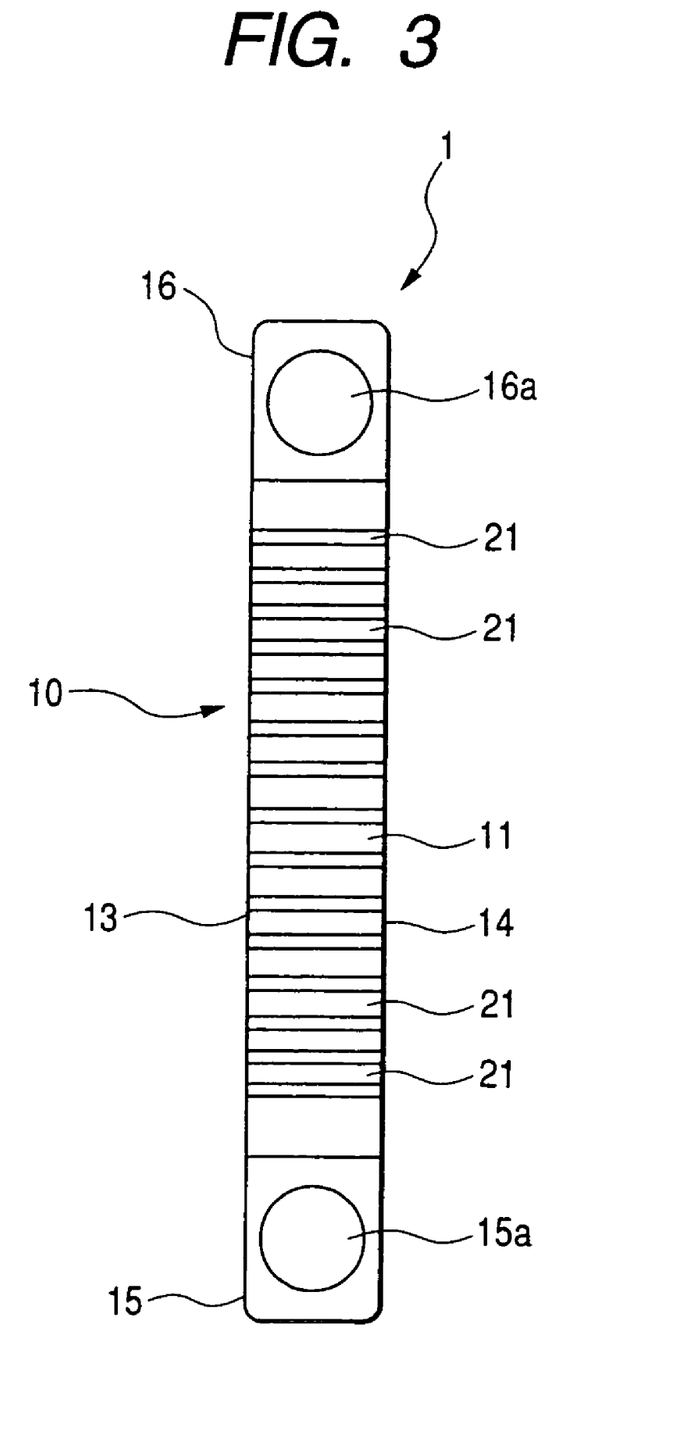
FIG. 3 is a view viewing FIG. 1 from II arrow mark direction.
Figure 4:
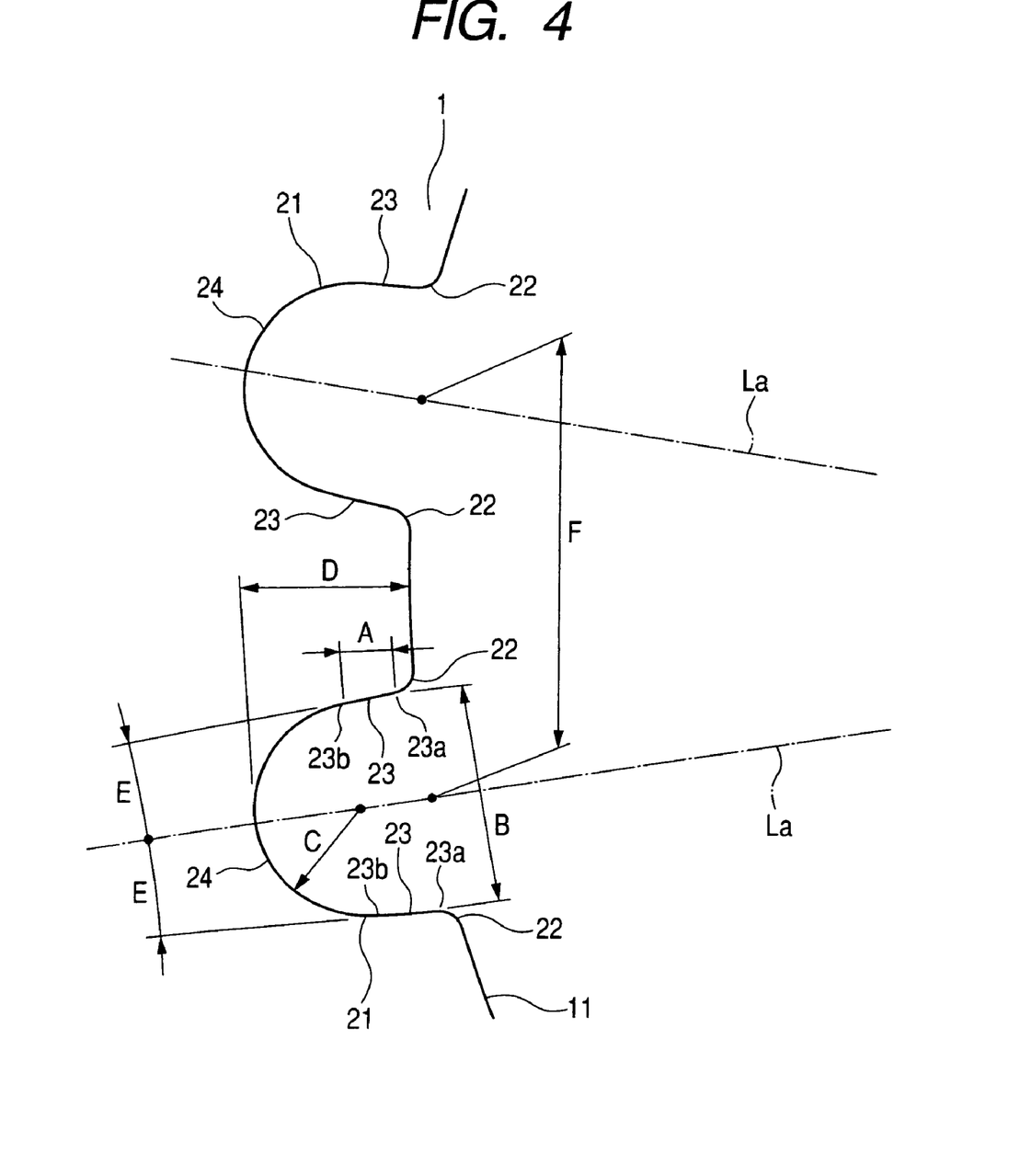
FIG. 4 is a view enlarging III portion of FIG. 2.

FIG. 1 is a perspective view showing an outline of an iron species preform according to a first exemplary embodiment, FIG. 2 is a view viewing FIG. 1 from an I arrow mark direction, FIG. 3 is a view viewing FIG. 1 from an allow mark II direction, and FIG. 4 is a view enlarging portion III of FIG. 2.

An iron species preform for forming a metal matrix composite (hereinafter, referred to as "iron species preform") 1 according to the first exemplary embodiment is formed by an iron species powder sintered member constituted by mixing an iron species powder, a copper powder, thereafter, a graphite powder, a lubricant powder or further mixing a fine power for improving machinability to constitute a mixed powder, thereafter charging the mixed powder into a die to form under pressure by using a press or the like to be sintered at 1100 through 1250° C. Further, as a sintering condition, it is preferable to adjust temperature and time such that a thermal expansion coefficient of the iron species powder sintered member becomes equal to or smaller than $13.5 \times 10^{-6\circ}$ C.

As shown by FIGS. 1 through 3, the iron species preform 1 includes a preform main body 10 a section of which is formed in a shape of a circular arc having an inner peripheral face 11 formed substantially in a shape of a semicircular arc and extended along a direction of a center axis L and an outer peripheral face 12 constituted by a shape of a circular arc and extended along a direction of the center axis L, and both ends of the preform main body 10 are integrally formed with flange portions 15, 16 respectively extended in a radius direction. The respective flange portions 15, 16 are bored with through holes 15a, 16a.

End faces 13, 14 of the preform main body 10 opposed to each other are formed with pluralities of end side grooves 17 (only a side of the end face 13 is illustrated) respectively extended in a circular arc shape, the outer peripheral face 12 is formed with a plurality of outer side grooves 18 extended along a direction of the center axis L in a peripheral direction substantially at equal spaces, and the inner peripheral face 11 is formed with a plurality of inner side grooves 21 extended along the direction of the center axis L in a peripheral direction substantially at equal spaces. By forming the respective grooves of the end side grooves 17, the outer side grooves 18, the inner side grooves 21, a surface area is increased and when the preform is inserted in an aluminum species alloy so as to be cast-in, the adherence and the bonding strength of the preform with the melted aluminum alloy are promoted, and depending on cases, the melted aluminum species alloy is melted to invade the preform to constitute MMC of the iron species preform 1. The end side groove 17, the outer side groove 18, the inner side groove 21 are formed in forming the preform under pressure by the die or machining the sintered member. Preferably, by simultaneously forming the grooves in forming the preform under pressure by the die, efficient formation of fabrication is achieved and fabrication cost is restrained.

As shown by FIG. 4, the respective inner side grooves 21 formed at the inner peripheral face 11 are recessed continuously extending along a direction of the center axis L by a section substantially in a U-shape opened to the center axis L. Each inner side groove 21 is formed by a symmetrical shape centering on a reference line La in a linear shape extended from the center axis L to a center of a groove width of the inner side groove 21 and a curved face in which a portion in which the inner peripheral face 11 and respective end edges 22, 22 are continuous is smoothly continuous, a so-to-speak R shape or faced shape. Base ends 23a, 23a are continuous to the respective end edges 22, 22 to form flat portions 23, 23 opposed to be continuous to each other by a groove bottom portion 24.

Figure 5:
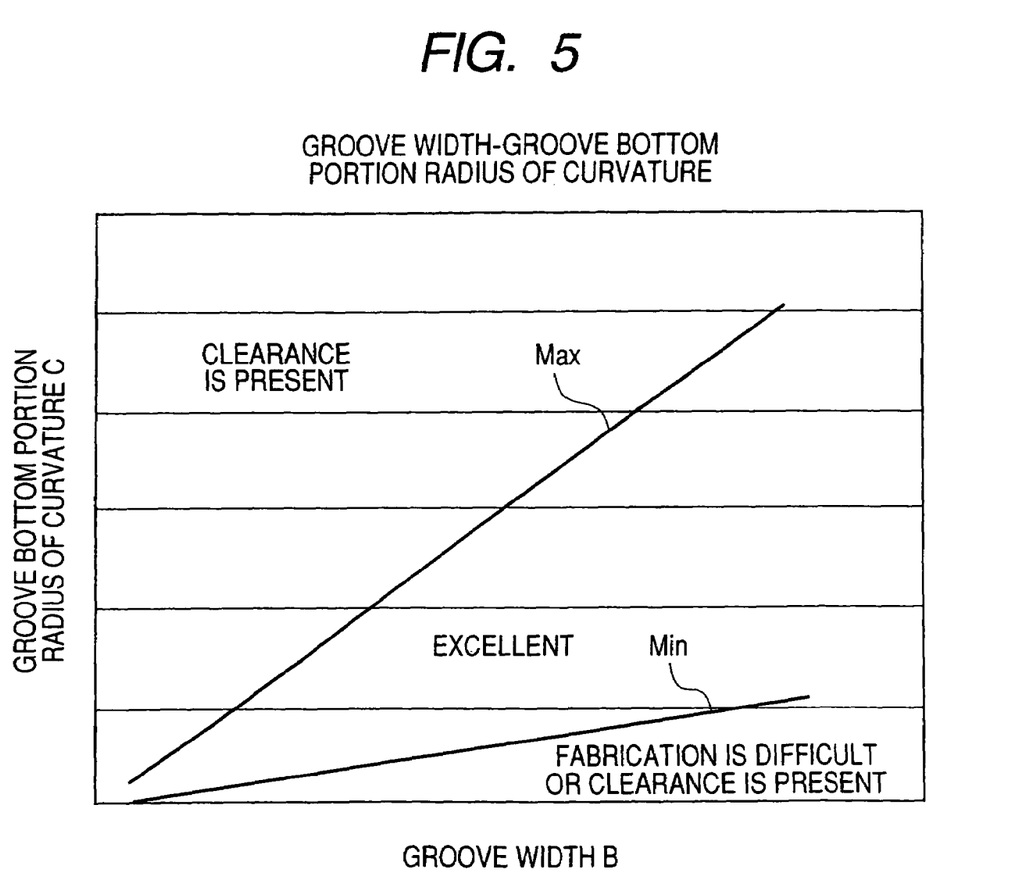
FIG. 5 is a relative relationship diagram of groove width—groove bottom portion radius of curvature.

A length "A" of respective flat portions 23, 23 of the inner side groove 21 formed in this way, that is, a length from the base ends 23a, 23a to the depth ends 23b, 23b is set to be equal to or larger than 0.1 mm and equal to smaller than 1.0 mm (0.1 mm≦A≦1.0 mm), and a dimension from one flat portion 23 to other flat portion 23 constituting a groove width "B" is set to be equal to or larger than 0.5 mm and equal to or smaller than 1.0 mm (0.5 mm≦B≦10.0 mm). Further, it is preferable that a radius of curvature "C" at respective portions of the groove bottom portion 24 in a sectional shape of the groove bottom portion 24 shown in FIG. 4 falls in a range of an upper limit Max and a lower limit Min indicated by linear lines in a relative relationship diagram of groove width—groove bottom portion radius of curvature of FIG. 5, that is, equal to or smaller than the groove width and equal to or larger than 0.2 times as much as a groove width B (B≧C≧0.2 B). According to the embodiment, the radius of curvature C is constituted by 0.5 times as much as the groove width "B", that is, the groove bottom portion 24 is formed by a shape of a circular arc a radius of which is 0.5 B.

Although the depth "D" of the inner side groove 21 is restricted by the length "A" of the respective flat portions 23, 23, the radius of curvature "C" of the groove bottom portion 24 and a shape of continuous portions of the inner peripheral face 11 and the respective end edges 22, 22, preferably, the depth "D" is set to be equal to or larger than 0.35 mm and equal to or smaller than 6.0 mm (0.35 mm≦D≦6.0 mm).

Further, it is preferable to set a direction of an opening of the inner side grove 21 such that an angle of inclination "E" of the respective flat portions 23, 23 relative to the reference line La in a shape of a linear line extended from the center axis L to the center of the groove width of the inner side groove 21 becomes equal to or smaller than 5° (E≦5°). Further, it is preferable to set a groove space "F" between the inner side grooves 21, 21 contiguous to each other, that is, a dimension between centers of the groove widths to be equal to or larger than 1.5 times as much as the groove width "B" and equal to or smaller than 5 times as much as the groove width B (1.5B≦F≦5B).

It is preferable to determine the length "A" of the flat portions 23, 23 of the inner side groove 21, the groove width "B", the radius of curvature "C" of the respective portions of the groove bottom portion 24, the depth "D" of the inner side groove 21, the angle of inclination "E" of the respective flat portions 23, 23, the groove space "F", the shape of the curved face of the continuous portions of the inner peripheral face 11 and the respective end edges 22, 22 of the inner side groove 21 by a close contact state of the interface of a product and a situation of cracking the base material side previously by an experiment or a simulation.

The iron species preform 1 is subjected to a shot blasting processing as necessary to constitute the surface roughness by 10 through 100 μm in Rz. By subjecting the iron species preform 1 to the shot blasting processing, a surface thereof is cleaned by removing an oxide film or the like formed at the surface, and the free Cu phase dispersed in the matrix is exposed to the surface. Thereby, the wettability with the melted aluminum species alloy and the cast-in performance with the aluminum species alloy are improved.

The iron species preform 1 formed in this way is set to a die, and by inserting the iron species preform 1 in the melted aluminum species alloy so as to be cast-in, the aluminum species alloy is easily and stably adhered to the iron species preform 1 to constitute MMC. Further, depending on cases, the aluminum species alloy is melted to invade the iron species preform 1.

Figure 6:
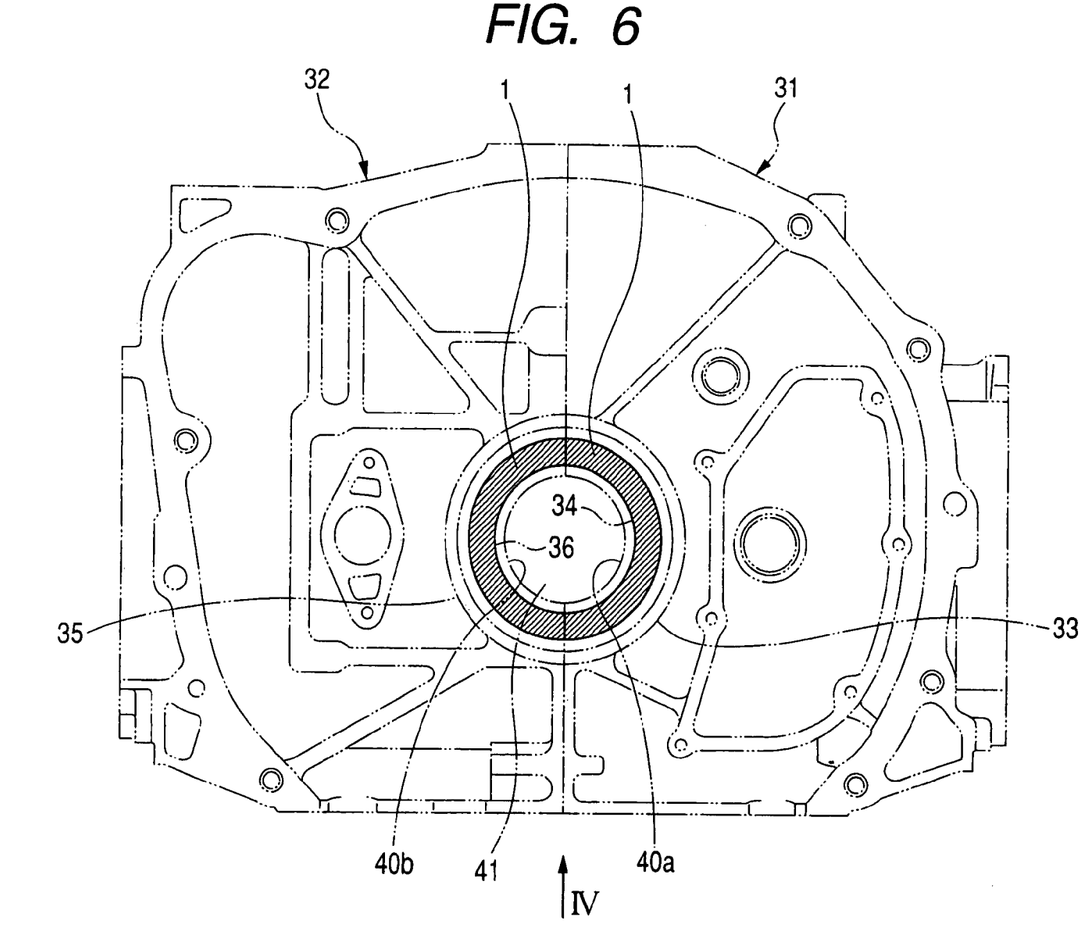
FIG. 6 is a view showing an embodiment of a journal portion using an iron species preform and is a vertical sectional view orthogonal to a crankshaft of a cylinder block.
Figure 7:
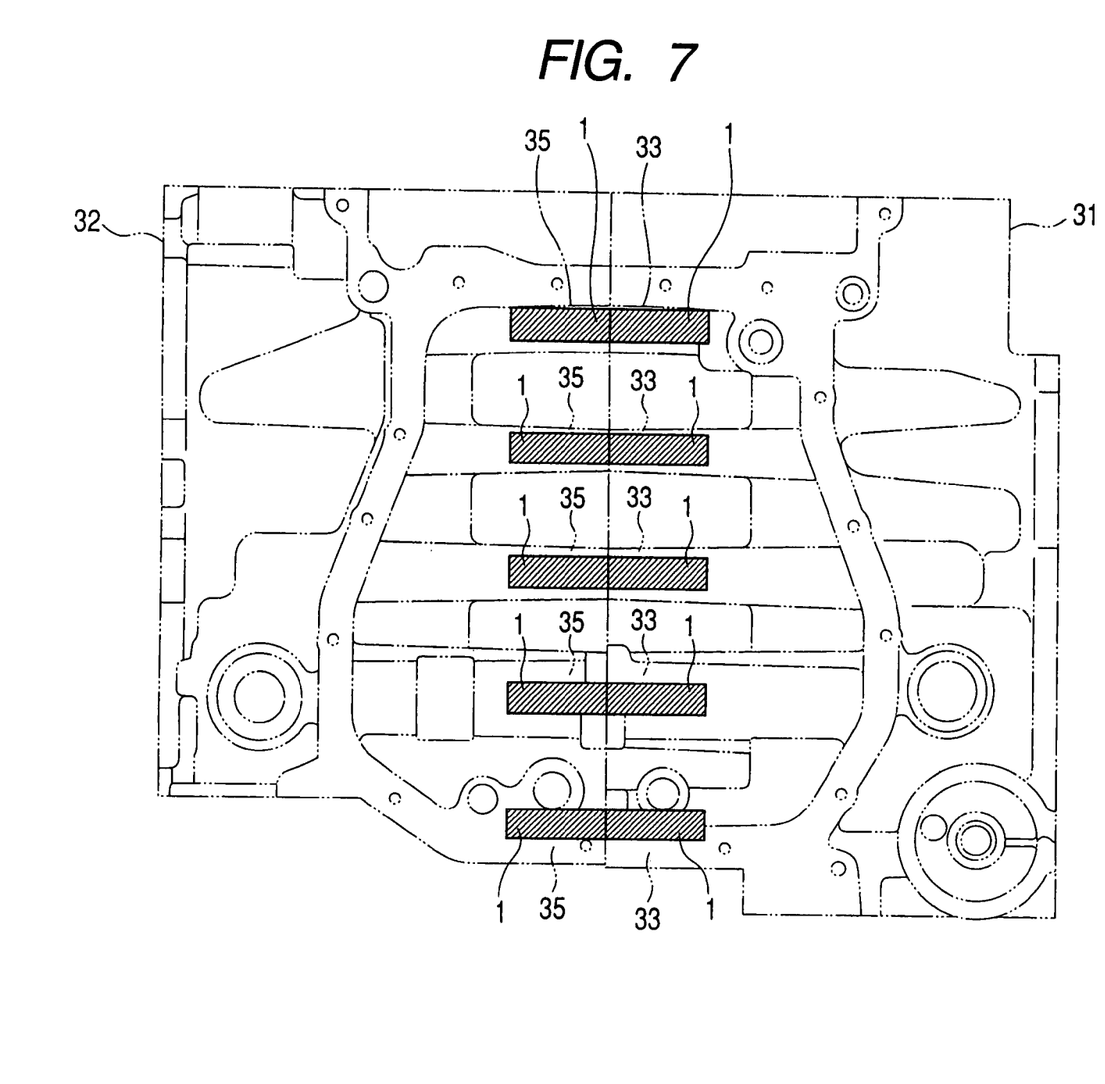
FIG. 7 is a view viewing FIG. 6 from IV arrow mark direction.

FIG. 6 and FIG. 7 show an example of a journal portion using the iron species preform. The example shows a journal portion of a crankshaft axially supporting a shaft of a horizontal opposed 4 cylinder engine, for example, a crankshaft, FIG. 6 is a vertical sectional view in a direction orthogonal to the crankshaft of the cylinder block, and FIG. 7 is a view viewing FIG. 6 from IV arrow mark direction.

In FIG. 6 and FIG. 7, left and right cylinder blocks 31, 32 are separately formed by casting by the aluminum species alloy, the cylinder block 31 on the left side is formed with a plurality of left side journal portions 33 having bearing faces 34 constituting recessed faces formed in a shape of a semicircular arc at center portions thereof, and also the right side cylinder block 32 is formed with a plurality of right side journal portions 35 having bearing faces 36 similar thereto.

A crankshaft 41 is arranged by interposing bearing metals 40a, 40b in a halved shape, that is, a semicircular arc shape to the bearing faces 34, 36 of the left and right of the respective journal portions 33, 35 to be pinched thereby, and is axially supported by interposing the bearing metals 40a, 40b to the bearing faces 34, 36 in the semicircular arc shape of the respective journal portions 33, 35. The crankshaft 41 is formed by an iron species steel material and is rotated by being transmitted with reciprocal movement of a piston by way of a connecting rod by combustion of a mixture gas at inside of a cylinder, always subjected to large impulsive load and is thermally expanded by transferring heat generated by combustion of the mixture gas.

According to the exemplary embodiment, the left and right respective journal portions 33, 35 are provided with the iron species performs 1 having a structure shown in FIG. 1 through FIG. 4 by constituting MMC. The respective iron species performs 1 are arranged in casting to form the respective cylinder blocks 31, 32 at positions of forming the journal portions of casting dies thereof to constitute MMC in a cast-in step.

In the cast-in step, the melted aluminum species alloy invades also the respective grooves of the end side groove 17, the outer side groove 18, the inner side groove 21, and in solidifying and shrinking the melted aluminum alloy for casting-in the iron species preform 1, a shrinking stress is dispersingly received by the respective end side grooves 17, the outer side groove 18, the inner side groove 21, movement of the melted aluminum species alloy is restrained, a residual stress generated at the aluminum species alloy, that is, the base material after shrinking can be alleviated and uniformly dispersed.

Figure 8:
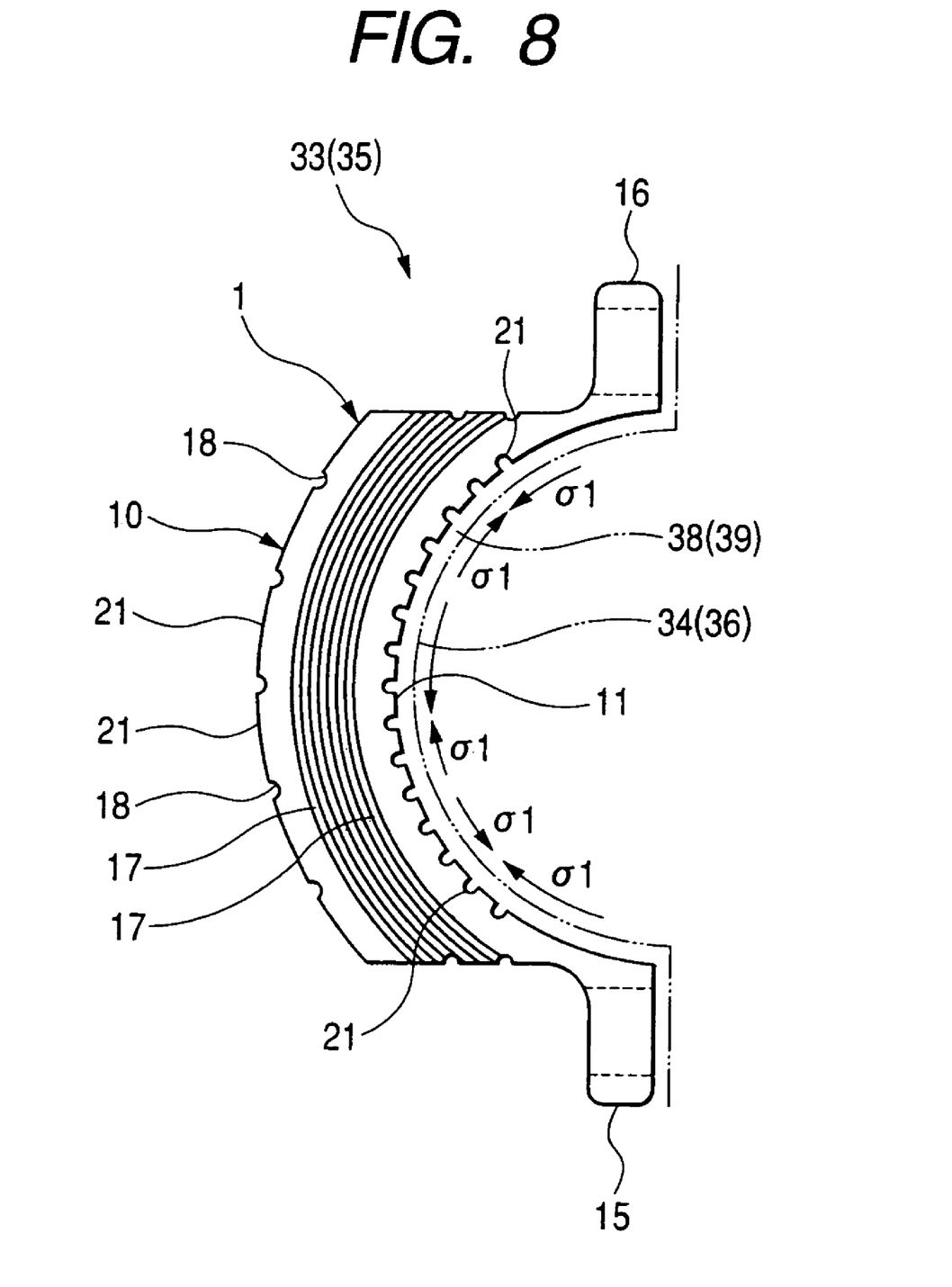
FIG. 8 is an explanatory view of a journal portion.

Further, in the melted aluminum species alloy injected to thin-walled portions 38, 39 extremely as thin as about 2 through 3 mm between bearing faces 34, 36 in a semicircular arc shape formed at the journal portions 33, 35 and the peripheral faces 11 of the iron species preform 1 as shown by FIG. 8, the melted aluminum species alloy invades inside of the inner side grooves 21 formed by a plurality thereof at the inner peripheral faces of the iron species performs 1 by being extended in the direction of extending the center axis line L. In solidifying and shrinking the melted aluminum species alloy injected to the thin-walled portions 38, 39 between the bearing faces 34, 36 of the journal portions 33, 35 and the inner peripheral faces 11 of the iron species performs 1, a shrinking stress σ1 is operated in a peripheral direction along the inner peripheral faces 11 of the iron species preform 1 as shown by FIG. 8, shrinkage in the peripheral direction accompanied by the solidification is uniformly received by the inner peripheral grooves 21 formed by numbers thereof at equal spaces in the peripheral direction at the inner peripheral faces 11 of the iron species performs 1 and movement in the peripheral direction accompanied by solidification is restrained. Thereby, the shrinking stress σ1 generated in solidifying and shrinking the melted aluminum species alloy is uniformly dispersed along the inner peripheral face 11 of the iron species preform 1 and by alleviating and making uniform the residual stress generated at the base material constituted by the aluminum species alloy after shrinking, the residual stress of the thin-walled portions 38, 39 between the bearing faces 34, 36 of the journal portions 33, 35 and the inner peripheral faces 11 of the iron species perform 1 is alleviated and the portion can be prevented from being cracked or the like.

Further, in accordance with restraining movement of the melted aluminum species alloy in the peripheral direction along the inner peripheral face 11 of the iron species preform 1 in solidifying and shrinking the melted aluminum alloy, the clearance at the interface of the inner peripheral face 11 of the iron species preform 1 and the thin-walled portions 38, 39 can be prevented from being produced and the strength of the interface of the inner peripheral face 11 and the thin-walled portions 38, 39 can be ensured.

Here, since the iron species preform 1 is structured by the iron species powder sintered member, the iron species preform 1 includes pores. The melted aluminum species alloy is easily and stably brought into close contact with the iron species preform 1 during the cast-in step to constitute MMC. Further, depending on cases, the aluminum species alloy is melted to invade the iron species preform 1. Therefore, a difference between the thermal expansion coefficient of the iron species preform 1 constituting MMC and the thermal expansion coefficient of the crankshaft 41 made of the iron species material is reduced. So, even when temperatures of the journal portions 33, 35 rise, the clearance between the crankshaft 41 and the bearing faces 34, 36 can be confined to an allowable range and vibration or noise in rotating the crankshaft 41 can be prevented from being brought about.

Further, by preventing the clearance at the interface of the inner peripheral face 11 of the iron species preform 1 and the thin-walled portions 38, 39 from being brought about and ensuring the strength of the interface of the inner peripheral face 11 and the thin-walled portions 38, 39, the thermal conduction efficiency between the thin-walled portions 38, 39 and the iron species preform 1 is promoted and the thermal conductivity becomes uniform in the peripheral direction of the journal portions 33, 35, the sides of the bearing faces 34, 36 of the journal portions 33, 35 are uniformly expanded and support of the bearing metals 40a, 40b by the journal portions 33, 35 becomes stable, an increase in the friction coefficient between the crankshaft 41 and the bearing metals 40a, 40b is restrained. Therefore, in accordance with the reduction in the friction resistance, fuel cost, function, durability or the like of the engine can be ensured.

Further, the clearance is eliminated at the interface of the thin-walled portions 38, 39 and the iron species preform 1 at the journal portions 33, 35, deformation by the load in machining the thin-walled portion, 38, 39 formed in thin-walls in machining the bearing faces 34, 36 of the journal portions 33, 35 is restrained and the accuracy of machining the journal portions 33, 35 is promoted.

Second Exemplary Embodiment

Figure 9:
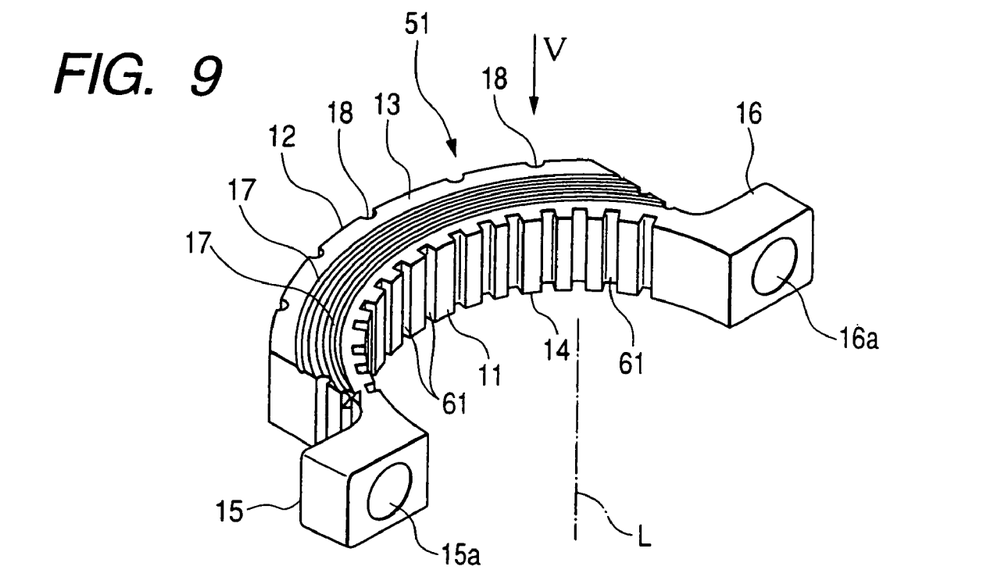
FIG. 9 is a perspective view showing an outline of an iron species preform according to a second exemplary embodiment.
Figure 10:
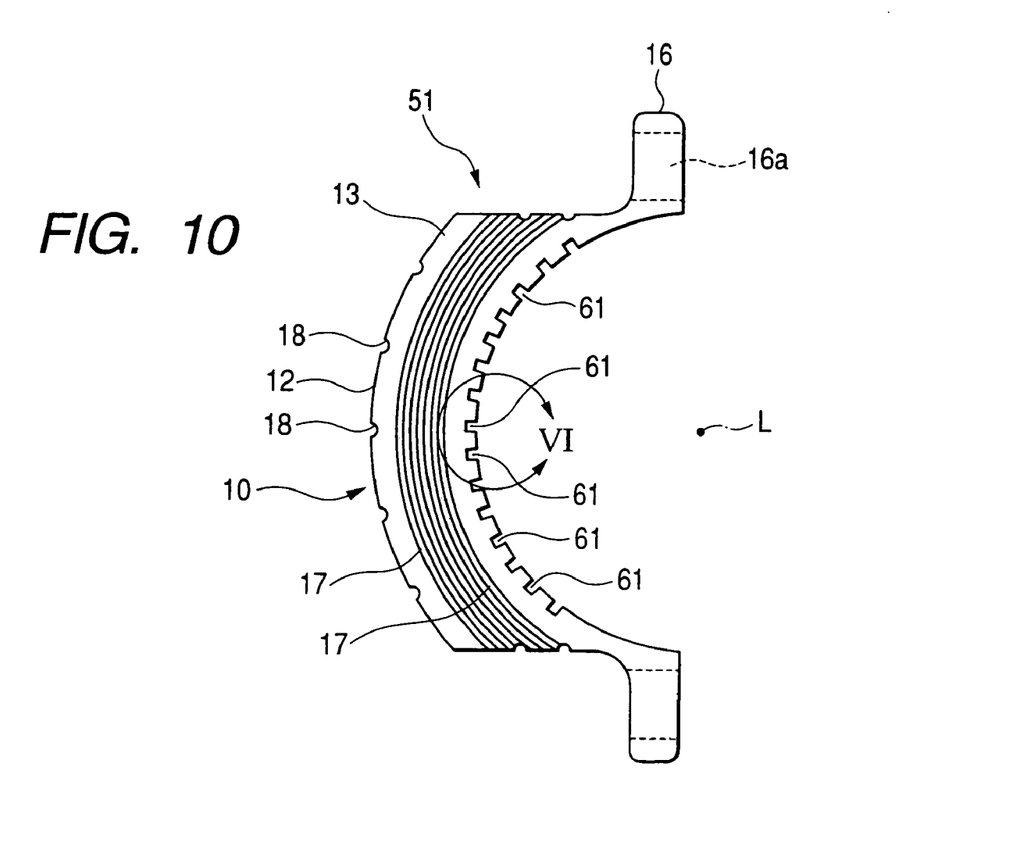
FIG. 10 is a view viewing FIG. 9 from V arrow mark direction.
Figure 11:
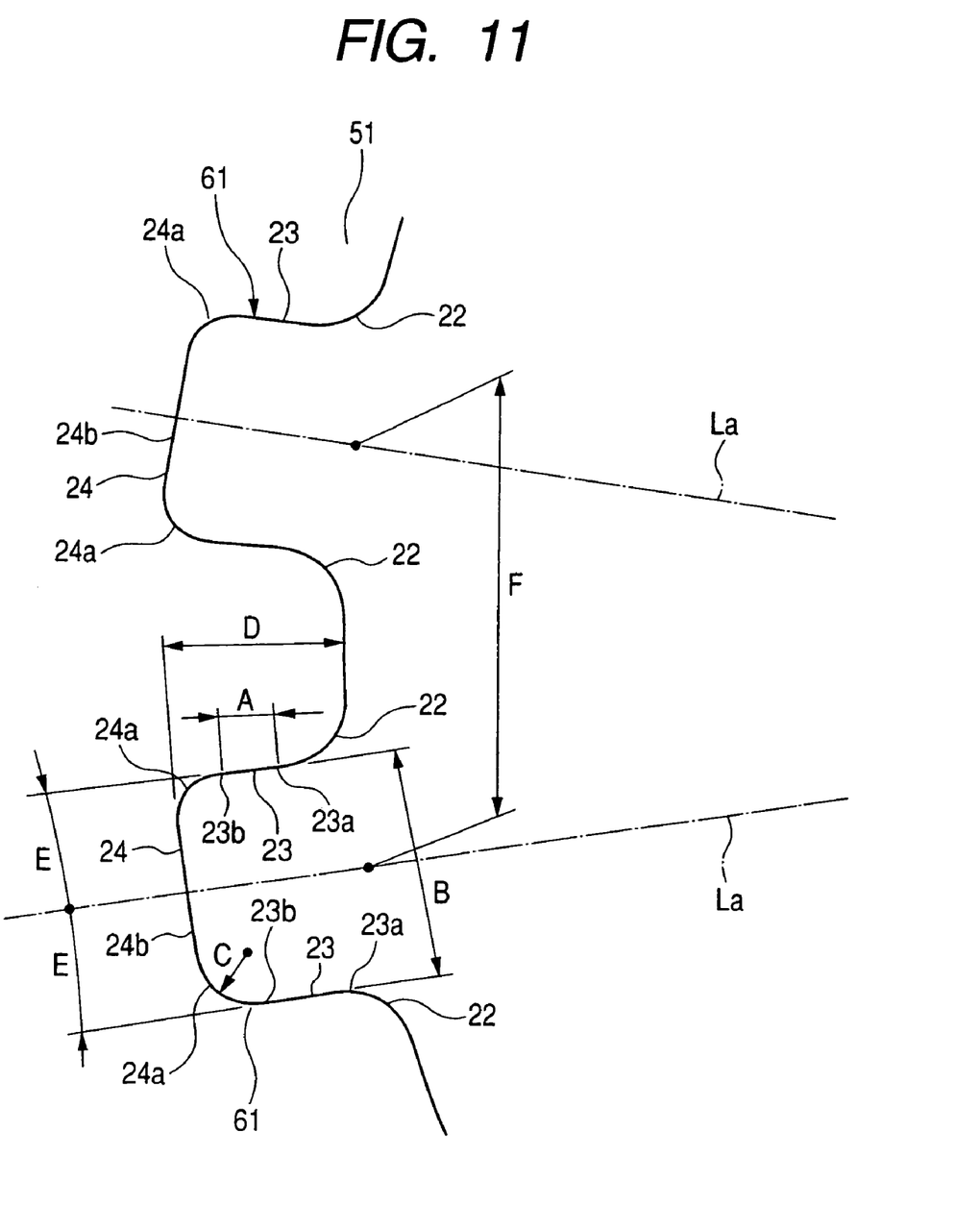
FIG. 11 is a view enlarging VI portion of FIG. 10.

FIG. 9 is a perspective view showing an outline of an iron species preform according to a second exemplary embodiment, FIG. 10 is a view viewing FIG. 9 in a V arrow mark direction, and FIG. 11 is a view enlarging a VI portion of FIG. 10. Further, portions in correspondence with those of FIG. 1 through FIG. 4 are attached with the same notations and a detailed explanation of the portions will be omitted.

An iron species preform 51 of the exemplary embodiment is formed by an iron species powder sintered member constituted by mixing, for example, an iron species powder, a copper powder, a graphite powder, a lubricant powder, or further mixing a fine powder for improving machinability to constitute a mixed powder, thereafter, charging the mixed powder to a die to form under pressure and sintering the mixed powder at 1100 through 1250° C.

As shown by FIG. 9 through FIG. 11, the iron species preform 51 includes the preform main body 10 formed by the section in the circular arc shape having the inner peripheral face 11 and the outer peripheral face 12 and the both ends of the preform main body 10 are integrally formed with the flange portions 15, 16.

The end faces 13, 14 of the preform main body 10 are respectively formed with pluralities of the end side grooves 17, the outer peripheral face 12 is formed with a plurality of the outer side grooves 18 substantially at equal spaces in the peripheral direction, and the inner peripheral face 11 is formed with a plurality of inner side grooves 61 extended along the direction of the center axis L substantially at equal spaces in the peripheral direction.

The respective inner side grooves 61 formed at the inner peripheral face 11 are recessed continuously extending along the direction of the center axis L by a section substantially in a U-shape opened to the side of the center axis L as shown by FIG. 11. Each of the inner side grooves 61 is constituted a symmetrical shape centering on the reference line La in the linear shape in which the direction of opening the inner side groove 61 is extended from the center axis L to a center of a groove width of the inner side groove 61, and a continuous portion of the inner peripheral face 11 and the respective end edges 22, 22 of the inner side groove 61 is formed by a smoothly continuous curved face, a so-to-speak R shape or a faced shape. The respective end edges 22, 22 are formed with the flat portions 23, 23 opposed to each other continuous from the base ends 23a, 23a, and the depth ends 23b, 23b of the respective flat portions 23, 23 are continuously formed by a groove bottom portion 24.

The length "A" of the respective flat portions 23, 23 of the inner side groove 61 formed in this way is set to be equal to or larger than 0.1 mm and equal to or smaller than 1.0 mm (0.1 mm≦A≦1.0 mm), and the groove width "B" is set to be equal to or larger than 0.5 mm and equal to or smaller than 10.0 mm (0.5 mm≦B≦10.0 mm). Further, the groove bottom portion 24 is constituted by a section in a U-shape having respective end portion ranges 24a, 24a having a section in a circular arc shape and continuous to the depth ends 23b, 23b of the flat portions 23, 23 and a depth portion range 24b in a flat face shape continuous between the respective end portion ranges 24a, 24a, and a radius of curvature "C" of the respective end portions ranges 24a, 24a is set to a range of the upper limit Max and the lower limit Min indicated by the linear lines in the relative relationship diagram of the groove width—groove bottom portion radius of curvature of FIG. 5, that is, equal to or smaller than the width B and equal to or larger than ⅕ times of the groove width "B" and equal to or smaller than 2 times of the groove width "B" (B≧C≧0.2B).

Although a depth "D" of the inner side groove 61 is restricted by the length "A" of the respective flat portions 23, 23, the radius of curvature "C" of the end portion ranges 24a, 24a of the groove bottom portion 24 and the shape of the continuous portion of the inner peripheral face 13 and the respective end edges 22, 22, the depth D is preferably set to be equal to or larger than 0.35 mm and equal to or smaller than 6.0 mm.

Further, it is preferable to set the direction of the opening of the inner side groove 61 such that the angle of inclination "E" of the respective flat portions 23, 23 relative to the reference line La in the linear shape extended from the center axis L to the center of the groove width of the inner side groove 61 to be equal to or smaller than 5°. Further, it is preferable to set the groove space "F" of the inner side grooves 61 and 62 contiguous to each other to be equal to or larger than 1.5 times as much as the groove width "B" and equal to or smaller than 5 times as much as the groove width "B" ($1.5B \leq F \leq 5B$).

The iron species preform 51 is subjected to the shot blasting processing as necessary and the surface roughness is set to 10 through 100 μm in Rz.

Figure 12:
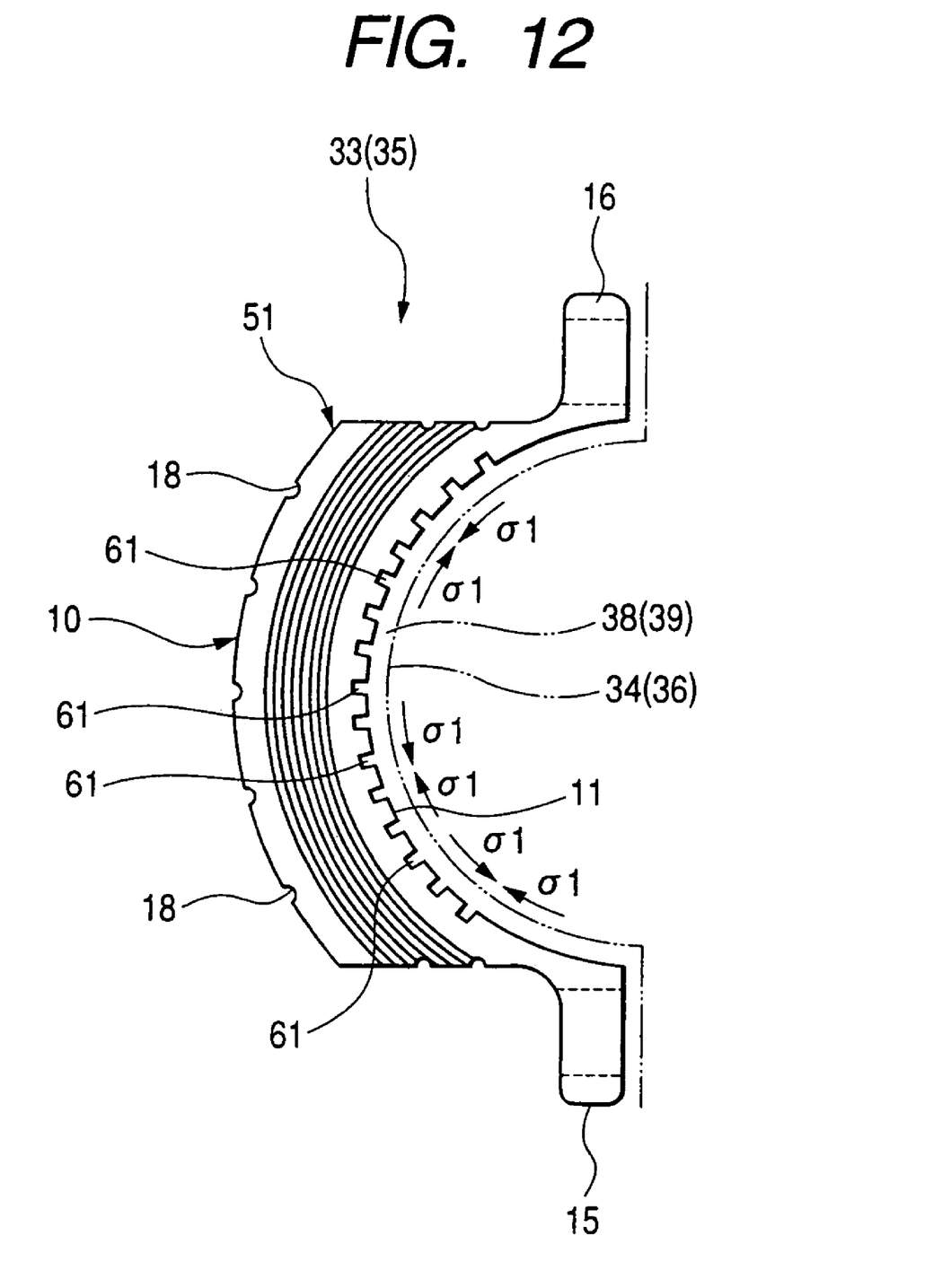
FIG. 12 is an explanatory view of a journal portion.

FIG. 12 is an explanatory view in correspondence with FIG. 8 showing an example of a journal portion using the iron species preform.

According to the example, informing the respective cylinder blocks 31, 32 by casting, the respective iron species performs 51 are provided to the left and right respective journal portions 33, 35 to be arranged at positions of forming the journal portions of the casting dies in the cast-in step by constituting MMC.

In the cast-in step, the melted aluminum species alloy invades also insides of the respective end side grooves 17, the outer side groove 18, the inner side groove 61, and in solidifying and shrinking the melted aluminum alloy inserted with the iron species preform 51 to be cast-in, the shrinking stress is dispersingly received by the respective end side grooves 17, the outer side groove 18, the inner side groove 61, movement of the melted aluminum species alloy is restrained, and the residual stress produced at the base material after shrinking can be alleviated and uniformly dispersed.

Particularly, as shown by FIG. 12, the space between the bearing faces 34, 36 in the semicircular shape formed at the journal portion, 33, 35 and the inner peripheral faces 11 of the iron species performs 11 are as extremely thin as about 2 through 3 mm and the melted aluminum species alloy injected to the thin-walled portions 38, 39 invades insides of the inner side grooves 61 formed by a number thereof at the inner peripheral face 11 of the iron species preform 51. In solidifying and shrinking the melted aluminum species alloy injected to the thin-walled portions 38, 39 between the bearing faces 34, 36 of the journal portions 33, 35 and the inner peripheral faces 11 of the iron species preforms 51, as shown by FIG. 10 by arrow marks, the shrinking stress σ1 is operated in the peripheral direction along the inner peripheral faces 11 of the iron species performs 51 and movement thereof in the peripheral direction accompanied by the solidification is restrained. Thereby, the shrinking stress σ1 generated in solidifying and shrinking the melted aluminum species alloy is uniformly dispersed along the inner peripheral faces 11 of the iron species preforms 51 and by a reduction and uniform formation of the residual stress generated at the base material constituted by the aluminum alloy after shrinking, the residual stress of the thin-walled portion 38, 49 between the bearing faces 34, 36 of the journal portions 33, 35 and the inner peripheral faces 11 of the iron species performs 51 is alleviated and the portion can be prevented from being cracked or the like.

Further, in accordance with restraining movement of the melted aluminum species alloy along the inner peripheral face 11 of the iron species preforms in solidifying and shrinking the melted aluminum species alloy, the clearance at the interfaces of the inner peripheral faces 11 of the iron species performs 51 and the thin-walled portions 38, 39 can be prevented from being brought about and the strength of bonding the inner peripheral faces 11 and the thin-walled portions 38, 39 can be ensured.

Here, the iron species preform 51 is structured by the iron species powder sintered member includes pores, during casting-in the iron species preform 51 with the melted aluminum species alloy, the melted aluminum species alloy is easily and stably brought into close contact with the iron species preform 51 to constitute MMC. Further, depending on cases, the aluminum species alloy is melted to invade the iron species preform 51. So, the difference between the thermal expansion coefficient of the iron species preform 51 constituting MMC and the thermal expansion coefficient of the crankshaft comprising the iron species material is reduced. Therefore, even when temperatures of the journal portions 33, 35 rise, the clearance between the crankshaft and the bearing faces 34, 36 can be confined to the allowable range and vibration or noise in rotating the crankshaft 41 can be prevented from being brought about.

When the sectional shapes of the respective inner side grooves 21, 61 formed at the inner peripheral faces 11 of the iron species preform 1 according to the first exemplary embodiment and the iron species preform 51 according to the second exemplary embodiment are assumedly constituted by a V-shape having an opening angle, although the melted aluminum species alloy injected to the thin-walled portions 38, 39 between the bearing faces 34, 36 of the journal portions 33, 35 and the inner peripheral faces 11 of the iron species performs 1, 51 invades insides of the respective inner side grooves 21, 61 in the cast-in step, a constraining force opposed to the shrinking stress σ1 operated in the peripheral directions along the inner peripheral faces 11 of the iron species performs 1, 51 in solidifying and shrinking the melted aluminum species alloy injected to the thin-walled portions 38, 39 is excessively small, and the shrinking stress σ1 cannot effectively be dispersed along the inner peripheral faces 11 of the iron species preforms 1, 51. As a result, the adherence of the interface becomes unstable by shrinkage produced by solidifying and shrinking the melted aluminum species alloy, a continuous clearance is produced at the interface and the strength of the interface becomes unstable. Meanwhile, when opening portions of the respective inner side grooves 21, 61 are narrower than the groove bottom portion 24 and provided with an undercut shape, it is difficult to form the iron species preforms 1, 51 under pressure by the dies, in order to addingly machine the respective inner side grooves 21, 61 by machining or the like, a considerable increase in the fabrication cost is brought about, the constraining force opposed to the shrinking stress σ1 operated in the peripheral direction along the inner peripheral faces 11 of the iron species preforms 1, 51 in solidifying and shrinking the melted aluminum species alloy becomes excessively large by the undercut shape, stress concentration is generated in solidifying and shrinking and a probability of breaking or cracking the base material, particularly the thin-walled portions 38, 39 is increased.

Further, when the length A of the flat portions 23, 23 of the respective inner side grooves 21, 61 is excessively smaller than 0.1 mm, the constraining force opposed to the shrinking stress σ1 operated in the peripheral direction along the inner peripheral face 11 of the iron species preform 1 in solidifying and shrinking the melted aluminum species alloy becomes excessively small, an effect of promoting adherence of the interface by shrinking produced in solidifying and shrinking the melted alloy becomes extremely small and a possibility of making the interface strength unstable is increased. On the other hand, when the length "A" of the flat portions 23, 23 of the respective inner side grooves 21, 61 exceeds 10.0 mm, the constraining force opposed to the shrinking stress σ1 operated in the peripheral direction along the inner peripheral faces 11 of the iron species preforms 1, 51 in solidifying and shrinking the melted aluminum species alloy by the flat portions 23, 23 becomes excessively large, stress concentration is generated to constitute a factor of breaking or cracking the base material, particularly, the thin-walled portions 38, 39. Further, when the length "A" of the flat portions 23, 23 of the respective inner side grooves 21, 61 exceeds 10.0 mm, it is difficult to form the iron species preforms 1, 51 by dies to constitute a considerable increase in the fabrication cost in order to addingly machine the respective inner side grooves 21, 61 by machining or the like.

Further, when the groove width "B" of the inner side grooves 21, 61 is smaller than 0.5 mm, the effect of promoting the adherence of the interface is extremely small, when subjected to the shot blasting processing, it is difficult to excellently blow shots into the inner side grooves 21, 61, the effect of the shot blasting processing cannot be expected. On the other hand, when the groove width "B" exceeds 10.0 mm, an effect of shrinking in accordance with solidifying the melted aluminum species alloy at inside of the inner side grooves 21, 61 becomes significant and the effect of promoting the adherence is extremely small. Further, there is a concern of reducing the original function and effect of the preform by reducing the volume of the iron species preforms 1, 51.

Further, when the radius of curvature "C" of the groove bottom portion 24 exceeds the groove width "B", the interface strength and the adherence are significantly deteriorated, when the radius of curvature "C" becomes smaller than ⅕ times as much as the groove width "B", the depth portion range 24 in the flat face shape of the groove bottom portion 24 according to the second embodiment is increased and the interface strength and the adherence are deteriorated.

Further, when the radius of curvature of the curved face or the faced shape of the faces shape smoothly making continuous the continuous portions of the inner peripheral face 11 and the respective end edges 22, 22 of the inner side grooves 21, 61 is excessively large, the interface strength and the adherence are deteriorated and on the other hand, when excessively small, fabrication of the iron species preforms 1, 51 becomes difficult, stress concentration is brought about in solidifying and shrinking the melted aluminum species alloy and the base material, particularly the thin-walled portions 38, 39 are broken or cracked. Further, when the angle of inclination "E" of the respective flat portions 23, 23 of the inner side grooves 21, 61 relative to the reference line La exceeds 5°, it is difficult to form the iron species preforms 1, 51 by dies, a significant increase in the fabrication cost is brought about in order to addingly machine the respective inner side grooves 21, 61 by machining or the like, the constraining force against the shrinking stress σ1 operated in the peripheral direction along the inner peripheral faces 11 of the iron species preforms 1, 51 in solidifying and shrinking the melted aluminum species alloy becomes excessively large and the possibility of breaking or cracking the thin-walled portions 38, 39 is increased.

Further, when the groove space "F" between the inner side grooves 21, 61 contiguous to each other is smaller than 1.5 times as much as the groove width "B", it is difficult to form the iron species preforms 1, 51 by dies, a considerable increase in the fabrication cost is brought about in order to addingly machine the respective inner side grooves 21, 61 by machining or the like and on the other hand, when the groove space "F" of the inner side grooves 21, 61 contiguous to each other exceeds 5 times as much as the groove width "B", the possibility of producing the clearance at the portion between the grooves is increased.

EXAMPLE

Respective iron species preforms having sectional shapes of the inner side grooves formed at the inner peripheral faces of the iron species preforms of groove shapes having a V-shape, an undercut shape, a semicircular arc shape, and a U-shape having a flat portion and a groove bottom portion similar to the groove shape of the above-described embodiments is inserted in an aluminum species alloy so as to be cast-in, and there is confirmed a close contact state of an interface, presence/absence of split or crack brought about at a base material. A result thereof is shown in Table 1.

In Table 1, V, UC, R, U of groove shapes respectively indicate a V-shape in the groove shape, a groove shape having an undercut shape, a semicircular arc shape, and a U-shape having a flat portion and a groove bottom portion, V90°, V60°, V30°, V5° respectively indicate groove shapes in a V-shape having an opening degree of 90°, 60°, 30°, 5°. Further, UC (2.5°), UC (0.5°) respectively indicate undercut shapes having taper angle of 2.5°, 0.5°. The groove space "F" is a space between centers of groove widths contiguous to each other which is indicated by a multiplication factor of the groove width "B", and the groove inclination angle "E" is an inclination angle of the inner-peripheral face relative to the reference line in the linear shape connecting the center axis of the inner peripheral face and the center of the groove width. Further, the close contact state is determined such that by cutting samples in a state in which the respective preforms are inserted an aluminum species alloy so as to be cast-in, a rate is calculated from a color check (colored state) and excellent (Good) of no clearance is defined by the close contact rate of 90% or more, and inferior (Bad) of presence of clearance is defined by less than 90%.

TABLE 1

| | groove shape | flat portion length A | groove width B | groove depth D | groove bottom portion radius of curvature | inclination angle E (or groove opening degree) | ratio of groove space to groove width F/B | shot presence/ absence | close contact state | presence/ absence of base material split, crack | remarks |
|---|---|---|---|---|---|---|---|---|---|---|---|
| 1 | V90° | — | 0.5 | (0.3) | — | (90) | 2 | — | Bad | not present | comparative example |
| 2 | V90° | — | 10 | (6) | — | (90) | 2 | — | Bad | not present | comparative example |
| 3 | V60° | — | 10 | (6) | — | (60) | 2 | — | Bad | not present | comparative example |

TABLE 1-continued

| | groove shape | flat portion length A | groove width B | groove depth D | groove bottom portion radius of curvature | inclination angle E (or groove opening degree) | ratio of groove space to groove width F/B | shot presence/ absence | close contact state | presence/ absence of base material split, crack | remarks |
|---|---|---|---|---|---|---|---|---|---|---|---|
| 4 | V30° | — | 0.5 | (0.3) | — | (30) | 2 | — | Bad | present | comparative example |
| 5 | V30° | — | 10 | (6) | — | (30) | 2 | — | Bad | present | comparative example |
| 6 | V5° | 0 | 10 | (6) | — | (5) | 2 | — | Bad | present | comparative example |
| 7 | UC(2.5°) | 0 | 10 | (5.0) | 0.25 | (−5) | 2 | — | Bad | present | comparative example |
| 8 | UC(0.5°) | 0 | 10 | (5.0) | 0.25 | (−1) | 2 | — | Bad | present | comparative example |
| 9 | R | 0 | 0.4 | (0.3) | 0.2 | 0 | 2 | — | Bad | not present | comparative example |
| 10 | R | 0 | 1 | (0.6) | 0.5 | 0 | 2 | — | Bad | not present | comparative example |
| 11 | R | 0 | 2 | (1.1) | 1 | 0 | 2 | — | Bad | not present | comparative example |
| 12 | R | 0 | 2.4 | (1.3) | 1.2 | 0 | 2 | — | Bad | not present | comparative example |
| 13 | R | 0 | 10 | (5.1) | 5 | 0 | 2 | — | Bad | not present | comparative example |
| 14 | U | 0.1 | 0.4 | (0.3) | 0.2 | 0 | 2 | — | Bad | not present | comparative example |
| 15 | U | 0.1 | 0.5 | (0.35) | 0.25 | 0 | 2 | — | Good | not present | invention example |
| 16 | U | 0.1 | 0.5 | (0.55) | 0.5 | 0 | 2 | — | Good | not present | invention example |
| 17 | U | 0.1 | 0.5 | (0.35) | 0.25 | 0 | 1.5 | — | Good | not present | invention example |
| 18 | U | 0.5 | 2 | (1.7) | 1 | 0 | 2 | — | Good | not present | invention example |
| 19 | U | 0.3 | 2.4 | (1.7) | 1.2 | 0 | 2 | — | Good | not present | invention example |
| 20 | U | 0.5 | 2.4 | (2.1) | 0.6 | 0 | 1.5 | — | Good | not present | invention example |
| 21 | U | 0.5 | 2.4 | (2.1) | 0.6 | 0 | 2 | — | Good | not present | invention example |
| 22 | U | 0.5 | 2.4 | (2.1) | 0.6 | 0 | 3 | — | Good | not present | invention example |
| 23 | U | 0.5 | 2.4 | (2.1) | 0.6 | 0 | 5 | — | Good | not present | invention example |
| 24 | U | 0.5 | 2 | (1.7) | 1 | 0 | 5 | — | Good | not present | invention example |
| 25 | U | 0.5 | 2 | (3.0) | 2 | 0 | 2 | — | Good | not present | invention example |
| 26 | U | 0.1 | 5 | (2.8) | 2.5 | 0 | 2 | — | Good | not present | invention example |
| 27 | U | 0.5 | 2 | (1.7) | 1 | 2.5 | 2 | — | Good | not present | invention example |
| 28 | U | 0.5 | 2 | (1.7) | 1 | 5 | 2 | — | Good | not present | invention example |
| 29 | U | 0.1 | 10 | (5.6) | 5 | 0 | 1.5 | — | Good | not present | invention example |
| 30 | U | 0.1 | 10 | (2.1) | 15 | 0 | 1.5 | — | Good | not present | invention example |
| 31 | U | 0.1 | 10 | (2.1) | 20 | 0 | 1.5 | — | Good | present | comparative example |
| 32 | U | 0.5 | 2 | (2.1) | 4 | 0 | 2 | — | Good | present | comparative example |
| 33 | U | 0.5 | 2 | (1.7) | 1 | 7.5 | 2 | — | Good | present | comparative example |
| 34 | U | 0.5 | 2 | (1.7) | 1 | 0 | 6 | — | Bad | not present | comparative example |
| 35 | U | 1.2 | 2 | (2.4) | 1 | 0 | 2 | — | Bad | present | comparative example |
| 36 | U | 0.1 | 5 | (2.8) | 2.5 | 0 | 6 | — | Bad | not present | comparative example |
| 37 | U | 0.1 | 12 | (6.3) | 6 | 0 | 2 | — | Bad | not present | comparative example |
| 38 | U | 0.1 | 0.5 | (0.35) | 0.25 | 0 | 2 | present | ○ | not present | invention example |
| 39 | U | 0.5 | 2 | (1.7) | 1 | 0 | 2 | present | ○ | not present | invention example |

TABLE 1-continued

| | groove shape | flat portion length A | groove width B | groove depth D | groove bottom portion radius of curvature | inclination angle E (or groove opening degree) | ratio of groove space to groove width F/B | shot presence/ absence | close contact state | presence/ absence of base material split, crack | remarks |
|---|---|---|---|---|---|---|---|---|---|---|---|
| 40 | U | 0.1 | 5 | (2.8) | 2.5 | 0 | 2 | present | ○ | not present | invention example |
| 41 | V90° | — | 0.5 | — | 0.25 | (90) | 2 | present | Bad | not present | comparative example |
| 42 | V90° | — | 10 | — | 0.25 | (90) | 1.5 | present | Bad | not present | comparative example |
| 43 | V60° | — | 10 | — | 0.25 | (60) | 1.5 | present | Bad | not present | comparative example |
| 44 | U | 0.5 | 2 | (1.7) | 1 | 0 | 6 | present | Bad | not present | comparative example |
| 45 | U | 0.1 | 5 | (2.8) | 2.5 | 0 | 6 | present | Bad | not present | comparative example |
| 46 | U | 0.1 | 12 | (6.3) | 6 | 0 | 2 | present | Bad | not present | comparative example |

It will be apparent to those skilled in the art that various modifications and variations can be made to the described exemplary embodiments of the present invention without departing from the spirit or scope of the invention. Thus, it is intended that the present invention cover all modifications and variations of this invention consistent with the scope of the appended claims and their equivalents.

What is claimed is:

1. An iron species preform for forming a metal matrix composite by casting-in the iron species preform with an aluminum species alloy base material, the iron species preform comprising:
    an inner peripheral face having a section in a semicircular shape and continuously extending along a direction of a center axis; and
    a plurality of inner side grooves formed on the inner peripheral face at spaces in a peripheral direction, each inner side groove continuously extending along the direction of the center axis and having a section of U-shape opened to the center axis,
    wherein each inner side groove includes:
        two flat portions opposed to each other and having base ends respectively continuous to end edges continuous to the inner peripheral face; and
        a groove bottom portion continuously formed between depth ends of the two flat portions, and
    when a length from the base end to the depth end of the flat portion is A, a groove width of the inner side groove is B, a radius of curvature of a sectional shape of the groove bottom portion orthogonal to the center axis is C, an angle of inclination of the flat portion relative to a reference line in a linear shape extended from the center axis to a center of the groove width is E, and a space between the centers of the respective groove widths of the inner side grooves contiguous to each other is F, then $0.1\ mm \leqq A \leqq 1.0\ mm$, $0.5\ mm \leqq B \leqq 10.0\ mm$, $C/B \leqq 1.5$, $E \leqq 5°$, and $F/B \leqq 5$.

2. The iron species preform according to claim 1, when the radius of curvature of the sectional shape of the groove bottom portion orthogonal to the center axis is C, then $0.2B \leqq C \leqq B$.

3. The iron species preform according to claim 1, wherein a portion at which the two end edges continuous to the inner peripheral face and the flat portion are continuous is a smoothly continuous curved face or a faced shape.

4. The iron species preform according to claim 1, when the space between the centers of the respective groove widths of the inner side grooves contiguous to each other is F, then $1.5B \leqq F \leqq 5B$.

5. The iron species preform for forming a metal matrix composite according to claim 1, wherein the iron species preform comprises an iron species powder sintered member.

6. A structure of a journal portion in which the iron species preform according to claim 1 is cast-in with an aluminum species alloy base material having a bearing face in a recess shape having a section in a semicircular arc shape along the inner peripheral face of the iron species preform and continuously extending along the direction of the center axis.

7. The iron species preform according to claim 1, when the radius of curvature of a sectional shape of the groove bottom portion orthogonal to the center axis is C, then $0.25B \leqq C \leqq B$.

* * * * *